US012594511B1

(12) United States Patent
Xia

(10) Patent No.: US 12,594,511 B1
(45) Date of Patent: Apr. 7, 2026

(54) DEVICE AND METHOD FOR ATOMIZING AND DEGASSING

(71) Applicant: Upchem (USA) Co., LTD., Spartanburg, SC (US)

(72) Inventor: Jianfeng Xia, Spartanburg, SC (US)

(73) Assignee: Upchem (USA) Co., LTD., Spartanburg, SC (US)

( * ) Notice: Subject to any disclaimer, the term of this patent is extended or adjusted under 35 U.S.C. 154(b) by 732 days.

(21) Appl. No.: 17/929,546

(22) Filed: Sep. 2, 2022

(51) Int. Cl.
| | |
|---|---|
| *B01D 19/00* | (2006.01) |
| *B01D 1/30* | (2006.01) |
| *B01D 3/06* | (2006.01) |
| *B01D 11/00* | (2006.01) |
| *B01D 11/02* | (2006.01) |
| *B01D 11/04* | (2006.01) |

(52) U.S. Cl.
CPC ..... *B01D 19/0047* (2013.01); *B01D 19/0015* (2013.01); *B01D 1/305* (2013.01); *B01D 3/06* (2013.01); *B01D 11/00* (2013.01); *B01D 2011/007* (2013.01); *B01D 11/0296* (2013.01); *B01D 11/04* (2013.01); *B01D 19/0036* (2013.01)

(58) Field of Classification Search
CPC .. B01D 19/0047; B01D 19/0015; B01D 3/06; B01D 11/00; B01D 11/04; B01D 5/006; B01D 2257/70; B01D 19/0036; B01D 1/305; B01D 11/0296; B01D 2011/007
See application file for complete search history.

(56) References Cited

U.S. PATENT DOCUMENTS

| | | | | |
|---|---|---|---|---|
| 3,576,317 A | * | 4/1971 | Huntington | ............ B01D 53/18 261/98 |
| 8,536,381 B2 | * | 9/2013 | Krafft | .................. C08G 59/063 568/844 |
| 2015/0265942 A1 | * | 9/2015 | Masetto | ............. B01D 19/0005 210/177 |
| 2017/0122091 A1 | * | 5/2017 | Paturu | ..................... E21B 43/36 |
| 2020/0071621 A1 | * | 3/2020 | Nicosia | .................... B01D 3/06 |

FOREIGN PATENT DOCUMENTS

| | | | | |
|---|---|---|---|---|
| CN | 112679388 A | | 4/2021 | |
| JP | 2001054703 A | * | 2/2001 | ......... B01D 19/0015 |

OTHER PUBLICATIONS

Translation of JP 2001054703 Obtained from Espacenet on Mar. 13, 2025 (Year: 2025).*

* cited by examiner

*Primary Examiner* — In Suk C Bullock
(74) *Attorney, Agent, or Firm* — Schwegman Lundberg & Woessner, P.A.

(57) ABSTRACT
A device and method for atomizing and degassing is provided. The device includes a first condenser, a second condenser, a packed tower and a fan. The first condenser is provided with a first feed inlet, a first discharge outlet, a first water inlet and a first water outlet. The packed tower is provided with a feed inlet, an air outlet and a liquid outlet. The first discharge outlet of the first condenser is connected with the feed inlet of the packed tower, a second feed inlet of the second condenser is connected with the air outlet of the packed tower, and a gas outlet of the second condenser is connected with the fan. Packing is arranged in the packed tower, and the packing is located between the feed inlet and the air outlet, and the feed inlet is located between the air outlet and the liquid outlet.

6 Claims, 2 Drawing Sheets

DEVICE AND METHOD FOR ATOMIZING AND DEGASSING

TECHNICAL FIELD

The disclosure relates to the field of gas treatment for organic solvents, in particular to a device and a method for atomizing and degassing.

BACKGROUND ART

At present, benzene or toluene or esters are needed to serve as solvents in many synthetic reactions (such as preparation processes of diisopropylbenzene isocyanate shown in Chinese patent publication No. CN112679388A), and hydrogen chloride gas can be dissolved in the solvents after the reactions are completed. In order to realize recovery and reuse of the solvents and hydrogen chloride, hydrogen chloride must be separated from the solvents.

At present, a method of removing the hydrogen chloride gas from an organic solvent is to heat the solvent to cause the hydrogen chloride gas to escape. Although the hydrogen chloride gas can be caused to escape from a solution using a heating method, the escaped hydrogen chloride gas entrains a part of the solvent in a form of liquid spray, that is, the escaped hydrogen chloride gas is still mixed with the part of the organic solvent in a liquid spray state, which reduces purity of the hydrogen chloride gas and affects its further reuse.

SUMMARY

In view of above problems, a device and a method for atomizing and degassing are provided in this disclosure.

Technical schemes adopted in the disclosure are as follows.

A method for atomizing and degassing includes following steps S1 and S2.

In step S1 (separation step), an organic solvent is placed in a negative pressure environment with a vacuum degree of −5 kPa to 0 kPa; and the solvent in negative pressure environment is in a flowing state.

In step S2 (condensation step), a gas flow escaping from the solvent is condensed, with an ambient temperature around the gas flow during condensation of 4° C. to 10° C.

In this method for atomizing and degassing, firstly, the organic solvent (hydrogen chloride gas is dissolved in the solvent, and a boiling point of the organic solvent is not lower than 70° C. in a standard state) is in a flowing state. Because the solvent is in the flowing state, the solvent in the flowing state makes the internally dissolved hydrogen chloride gas more volatile than the solvent in a static state, and further the environment is a negative pressure environment and the solvent is in a heated state, so molecular activity of the solvent is relatively high. In this state, gas molecules dissolved in the liquid (i.e. hydrogen chloride) are easily volatilized.

Therefore, in the method, the organic solvent is in the flowing state and the organic solvent is heated in the negative pressure environment, so that the gas dissolved in the organic solvent is easily volatilized, which can reduce heating degree of the organic solvent, volatilization amount of the organic solvent, and content of the organic solvent (including gas and liquid spray) in a hydrogen chloride gas flow.

At the same time, in this method, the gas flow escaping from the organic solvent is condensed, and the organic solvent can be precipitated in a form of droplets at 4° C. to 10° C. but the hydrogen chloride gas may not, thus realizing separation of the hydrogen chloride gas from the organic solvent.

To sum up, in this method, the organic solvent in which the hydrogen chloride gas is dissolved is placed and heated in the negative pressure environment and the organic solvent is in the flowing state, so that the hydrogen chloride gas can be easier to escape from the organic solvent, and the content of the organic solvent in the hydrogen chloride gas flow can be reduced. At the same time, the separated hydrogen chloride gas is condensed at 4° C. to 10° C., so that organic solvent molecules in the gas flow can be precipitated in the form of droplets, thus obtaining pure hydrogen chloride gas.

A device applicable to the method for degassing includes a first condenser, a second condenser, a packed tower and a fan.

The first condenser is provided with a first feed inlet, a first discharge outlet, a first water inlet and a first water outlet.

The second condenser is provided with a second feed inlet, a gas outlet, a liquid outlet, a second water inlet and a second water outlet.

The packed tower is provided with a feed inlet, an air outlet and a liquid outlet.

The first discharge outlet of the first condenser is connected with the feed inlet of the packed tower, the second feed inlet of the second condenser is connected with the air outlet of the packed tower, and the gas outlet of the second condenser is connected with the fan.

A packer filled with packing is arranged in the packed tower, and the packer is located between the feed inlet and the air outlet, and the feed inlet is located between the air outlet and the liquid outlet.

Optionally, the device further includes a guide pipe, an orifice of which is connected with the feed inlet and the other orifice of which faces the liquid outlet.

Optionally, the packer is a plate-shaped packer, and there are a plurality of packers, which are fixed in the packed tower, and the packers are in a parallel state, and there is a gap between two adjacent packers. The packer is provided with a tapered column, a tapered end of which faces the liquid outlet of the packed tower, and the packer is provided with a through hole.

Optionally, the device further includes a collector, and the collector is connected with the liquid outlet of the second condenser.

Optionally, the device further includes a plug-in pipe. The plug-in pipe is arranged on the packed tower, two orifices of the plug-in pipe are both located outside the packed tower, a part of a pipe wall of the plug-in pipe is located inside the packed tower, and the plug-in pipe is hermetically matched with a tower wall of the packed tower.

Optionally, the plug-in pipe is located between the packer and the liquid outlet.

Optionally, the plug-in pipe is a round pipe, and the plug-in pipe is parallel to the packer.

Combined with the device provided above, a method for atomizing and degassing is provided in the disclosure, which includes following steps.

A separation step, an organic solvent dissolved with hydrogen chloride gas is fed from the first feed inlet of the first condenser, and a high-temperature fluid is introduced into the first feed inlet and then flows out from the first water outlet. The first condenser is placed in a negative pressure environment with a relative vacuum of −5 kPa to 0 kPa, and the hydrogen chloride gas dissolved in the organic solvent escapes through heat exchange with the high-temperature fluid to form a gas flow. The organic solvent is partially atomized, and the gas flow and the partially atomized organic solvent form a mixed gas liquid which enters the packed tower together through the feed inlet of the packed tower.

An absorption step, gas-liquid diversion is made on the mixed gas liquid by the packed tower, and the gas flows out of the gas outlet through the packer upwards, the packer absorbs the organic solvent in the gas, and the liquid flows out of the liquid outlet downwards.

A condensation step, a low-temperature fluid enters the second water inlet and flows out of the second water outlet. The gas flowing out of the gas outlet of the packed tower flows through the second feed inlet and enters the second condenser. The organic solvent in the gas condenses at 4° C. to 10° C. and can be precipitated in a form of droplets. The precipitated organic solvent droplets leave the second condenser from the liquid outlet of the second condenser; and the gas exits from the gas outlet.

The disclosure has following beneficial effects. The organic solvent in which the hydrogen chloride gas is dissolved is placed and heated in the negative pressure environment and the organic solvent is in the flowing state, so that the hydrogen chloride gas can be easier to escape from the organic solvent, and the content of the organic solvent in the hydrogen chloride gas flow can be reduced. At the same time, the separated hydrogen chloride gas is condensed at 4° C. to 10° C., so that organic solvent molecules in the gas flow is precipitated in the form of droplets, thus obtaining pure hydrogen chloride gas.

Figure 1:
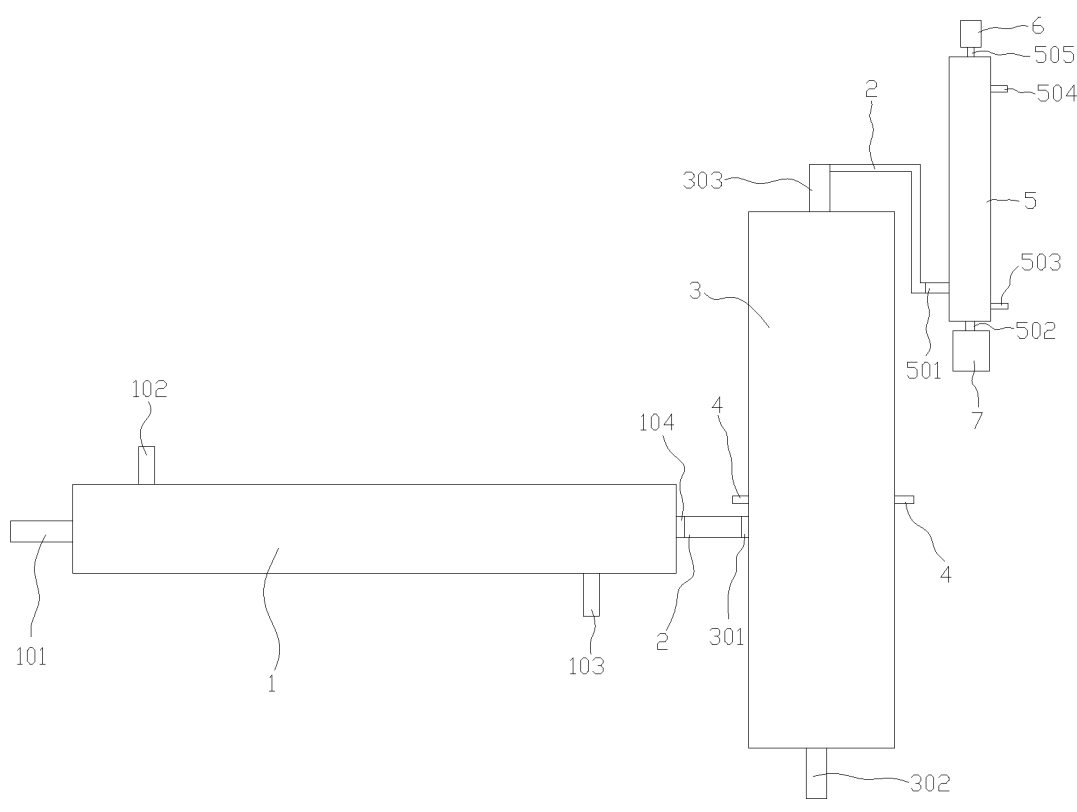
FIG. 1 is a schematic diagram of a device for atomizing and degassing according to the disclosure.

Reference numbers in the figures are as follows. 1. First Condenser; 101. First Feed Inlet; 102. First Water Outlet; 103. First Water Inlet; 104. First Discharge Outlet; 2. Pipeline; 3. Packed Tower; 301. Feed inlet; 302. Liquid Outlet; 303. Air Outlet; 4. Plug-in Pipe; 5. Second Condenser; 501. Second Feed Inlet; 502. Liquid Outlet; 503. Second Water Inlet; 504. Second Water Outlet; 505. Gas Outlet; 6. Fan; 7. Collector; 8. Packer; 801. Tapered Column; 802. Through Hole; 9. Guide Pipe.

DETAILED DESCRIPTION

The present disclosure will be described in detail with reference to the accompanying drawings.

Embodiment 1

In step S1 (separation step), an organic solvent is placed in a negative pressure environment with a vacuum degree of −5 kPa to 0 kPa; and the solvent in negative pressure environment is in a flowing state.

In step S2 (condensation step), a gas flow escaping from the solvent is condensed, with an ambient temperature around the gas flow during condensation of 4° C. to 10° C.

In this method for atomizing and degassing, firstly, the organic solvent (hydrogen chloride gas is dissolved in the solvent, and a boiling point of the organic solvent is not lower than 70° C. in a standard state) is in a flowing state. Because the solvent is in the flowing state, the solvent in the flowing state makes the internally dissolved hydrogen chloride gas more volatile than the solvent in a static state, and further the environment is a negative pressure environment and the solvent is in a heated state, so molecular activity of the solvent is relatively high. In this state, gas molecules dissolved in the liquid (i.e. hydrogen chloride) are easily volatilized.

Therefore, in the method, the organic solvent is in the flowing state and the organic solvent is heated in the negative pressure environment, so that the gas dissolved in the organic solvent is easily volatilized, which can reduce heating degree of the organic solvent, volatilization amount of the organic solvent, and content of the organic solvent (including gas and liquid spray) in a hydrogen chloride gas flow.

At the same time, in this method, the gas flow escaping from the organic solvent is condensed, and the organic solvent can be precipitated in a form of droplets at 4° C. to 10° C. but the hydrogen chloride gas may not, thus realizing separation of the hydrogen chloride gas from the organic solvent.

In this embodiment, the organic solvent may be benzene, toluene, xylene, esters, etc.

Embodiment 2

A device applicable to the method for degassing described in Embodiment 1 includes a first condenser 1, a second condenser 5, a packed tower 3 and a fan 6.

The first condenser 1 is provided with a first feed inlet 101, a first discharge outlet 104, a first water inlet 103 and a first water outlet 102.

The second condenser 5 is provided with a second feed inlet 501, a gas outlet 505, a liquid outlet 502, a second water inlet 503 and a second water outlet 504.

The packed tower 3 is provided with a feed inlet 301, an air outlet 303 and a liquid outlet 302.

The first discharge outlet 104 of the first condenser 1 is connected with the inlet 301 of the packed tower 3 through a pipe 2, the second feed inlet 501 of the second condenser 5 is connected with the air outlet 303 of the packed tower 3 through the pipe 2, and the gas outlet 505 of the second condenser 5 is connected with the fan 6.

A packer 8 filled with packing is arranged in the packed tower 3, and the packer 8 is located between the feed inlet 301 and the air outlet 303, and the feed inlet 301 is located between the air outlet 303 and the liquid outlet 302.

Optionally, in this embodiment, the first condenser is horizontally arranged, and the second condenser and the packed tower are both vertically arranged.

Specifically, this device is used as follows. Firstly, a high-temperature liquid (such as 55° C. water) enters from the first water inlet 103 of the first condenser 1 and then exits from the first water outlet 102. Then, an ambient temperature in the first condenser 1 is about 55° C., and then the organic solvent enters the first condenser 1 from the first feed inlet 101 (flows from left to right in the first condenser 1). Because the fan 6 is pumping air and the first condenser 1, the second condenser 5 and the packed tower 3 are all communicated with each other, the first condenser 1 is in a negative pressure state, and the hydrogen chloride gas dissolved in the organic solvent may escape to form a hydrogen chloride gas flow and a part of the organic solvent may be atomized, and the hydrogen chloride gas flow can enter the packed tower 3 together with the solvent flow.

In the packed tower 3, the gas flow is separated from the liquid flow, and the gas (the partially atomized organic solvent and hydrogen chloride gas flow) flows upward to the gas outlet 303, while the liquid flows downward to the liquid outlet 302. During flowing of the gas to the gas outlet 505, it needs to pass through the packer 8. The packer 8 functions to stabilize the gas flow, and at the same time, to adsorb the mixed organic solvent in a liquid spray state in the gas flow, so that the organic solvent in the liquid spray state can be adhered to the packer 8. The packing can be determined according to a type of the organic solvent, and can be commercially available.

The gas leaving the packed tower 3 enters the second condenser 5, and after which the low-temperature liquid (such as water at a temperature of 5° C. to 10° C.) enters the second water inlet 503 and then leaves from the second water outlet 504. At this time, the ambient temperature in the second condenser 5 is 5° C. to 10° C., and the organic solvent (in the liquid spray state or gas state) in the gas is precipitated in the form of droplets. And the organic solvent droplets leave the second condenser 5 from the liquid outlet 502 of the second condenser 5, and the hydrogen chloride gas is pumped out of the gas outlet 505 by the fan 6, which can be reused. Content of the organic solvent in the resulting hydrogen chloride gas is measured to be below 0.0001% (volume fraction).

In order to ensure that all of the first condenser 1, the packed tower 3 and the second condenser 5 are in the negative pressure state, the liquid outlet 302 of the packed tower can be blocked when necessary.

Figure 2:
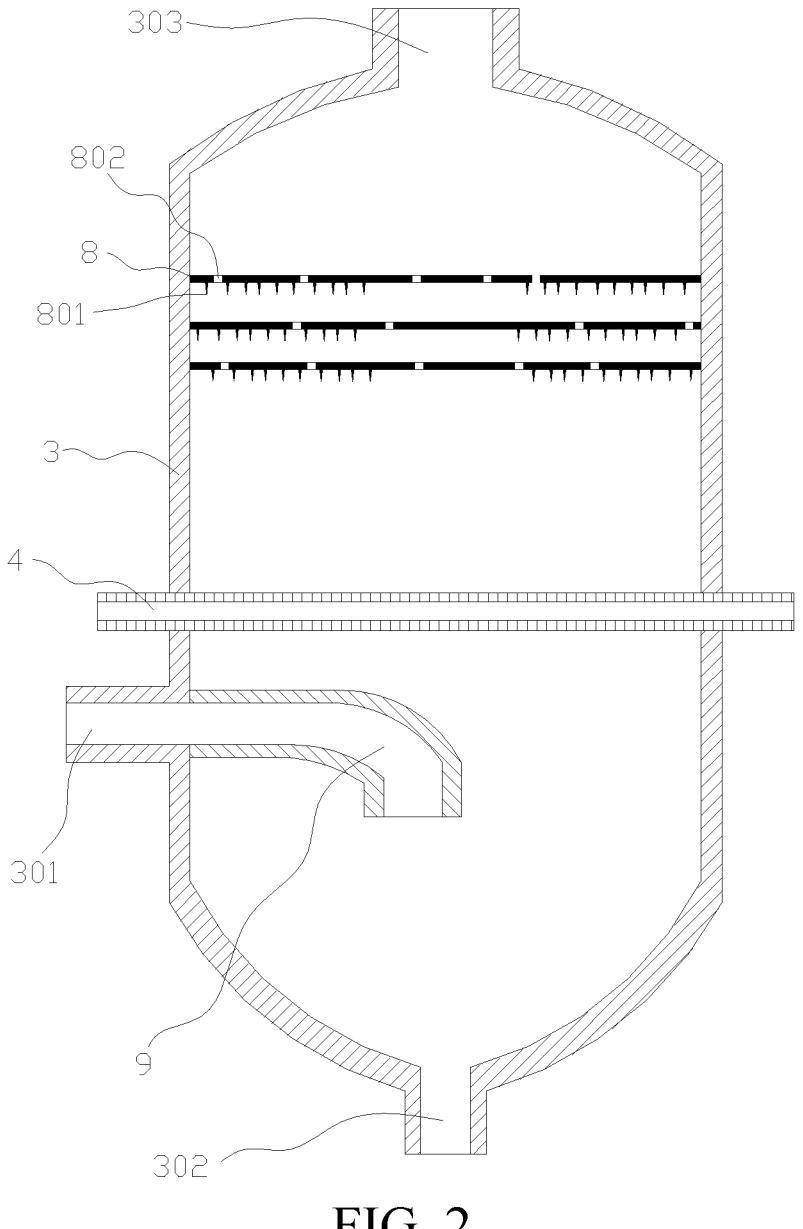
FIG. 2 is a schematic diagram of a structure of a packed tower according to the disclosure.

As shown in FIGS. 1 and 2, the device further includes a guide pipe 9, an orifice of which is connected with the feed inlet 301 and the other orifice of which faces the liquid outlet 302.

Specifically, the guide pipe 9 guides the gas flow and liquid flow to the liquid outlet 302 of the packed tower 3, and the liquid may continue to flowing to the liquid outlet 302 due to its own gravity, while the gas may flow to the second condenser 5 due to pumping of the fan 6.

As shown in FIGS. 1 and 2, the packer 8 is a plate-shaped packer 8, and there are a plurality of packers 8 (three packers are used in this embodiment), which are fixed in the packed tower 3, and the packers 8 are in a parallel state, and there is a gap between two adjacent packers 8. The packer 8 is provided with a tapered column 801, a tapered end of which faces the liquid outlet 302 of the packed tower 3, and the packer 8 is provided with a through hole 802. Through holes of the packers in different levels are not located on the same straight line, so as to increase a flowing distance of the gas.

Specifically, the tapered column 801 is arranged on the plate-shaped packer 8, so as to increase a contact area between the organic solvent in the liquid spray state and the packing, so that the organic solvent is easier to be precipitated and adhered to the packing, and the organic solvent precipitated and adhered to the packing flows to the liquid outlet 502 under action of gravity.

The through hole 802 in the packer 8 serves as a gas passage, and the gas flow can pass through the packer 8 via the through hole 802. Also, the precipitated organic solvent droplets can also drop out to the liquid outlet 302 through the through hole 802.

As shown in FIGS. 1 and 2, the device further includes a collector 7, and the collector 7 is connected with the liquid outlet 502 of the second condenser 5.

The collector 7 serves to collect the organic solvent liquid flowing out of the second condenser 5.

As shown in FIGS. 1 and 2, the device further includes a plug-in pipe 4. The plug-in pipe 4 is arranged on the packed tower 3, two orifices of the plug-in pipe 4 are located outside the packed tower 3, a part of a pipe wall of the plug-in pipe 4 is located inside the packed tower 3, and the plug-in pipe 4 is hermetically matched with a tower wall of the packed tower 3.

The plug-in pipe 4 is provided and the two orifices of the plug-in pipe 4 are located outside the packed tower 3. This is designed to cool the gas flow in the packed tower 3 when necessary, so that the organic solvent (including the organic solvent in the liquid spray state or gas state) mixed in the gas flow can be more easily precipitated and adhered to the packing. Specifically, operation is as follows. The low-temperature liquid (such as water at 4° C.) is introduced into one of the orifices of the plug-in pipe 4, and the low-temperature liquid flows out of the other orifice of the plug-in pipe 4, and in this way the air flow in the packed tower 3 can be cooled.

As shown in FIGS. 1 and 2, the plug-in pipe 4 is located between the packer 8 and the liquid outlet 302.

Specifically, the plug-in pipe 4 can be one, or a plurality of plug-in pipe 4 can be arranged on the packed tower 3.

As shown in FIGS. 1 and 2, the plug-in pipe 4 is a round pipe, and the plug-in pipe 4 is parallel to the packer 8.

Specifically, in this device, the packed tower 3, the packer 8 and the plug-in pipe 4 are all made of nonmetallic materials (the nonmetallic materials need to be resistant to corrosion of organic solvents and hydrogen chloride gas, such as polytetrafluoroethylene).

It is convenient to install the round pipe on the packed tower 3, and it is easy to seal the gap between the plug-in pipe 4 and the packed tower 3 after installation.

Specifically, in this embodiment, an absorber can be arranged at an air outlet of the fan 6, so that the hydrogen chloride gas can be directly absorbed, and the fan 6 can also directly pump the hydrogen chloride gas into a gas storage tank for storage.

Referring to FIG. 1, in this embodiment, specifically, the packed tower 3 is in a vertical state, with the air outlet 303 facing upwards and the liquid outlet 302 facing downwards. The air outlet 303 is located above the packed tower 3 and the liquid outlet 302 is located below the packed tower 3.

Referring to FIG. 1, the second condenser 5 is in a vertical state, with the gas outlet 505 facing upwards and the liquid outlet 502 facing downwards. The gas outlet 505 is located above the second condenser 5 and the liquid outlet 502 is located below the second condenser 5.

Comparative Embodiment 1

Its difference from Embodiment 2 is only in that the first condenser is not under a negative pressure, and content of the organic solvent in the final hydrogen chloride gas is 0.02% (volume fraction).

Comparative Embodiment 2

Its difference from Embodiment 2 is only in that the second condenser is not provided, the air outlet 303 is directly connected with the fan 6, and content of the organic solvent of the resulting hydrogen chloride gas is 0.01% (volume fraction).

Comparative Embodiment 3

Its difference from Embodiment 2 is only in that the packer is not provided, and content of the organic solvent of the resulting hydrogen chloride gas is 0.001% (volume fraction).

The above is only preferred embodiments of the present disclosure, which does not limit a protection scope of the present disclosure. Any equivalent transformation made with content of the specification of the present disclosure, which is directly or indirectly applied to other related technical fields, is included within the scope of the disclosure.

What is claimed is:

1. A device for atomizing and degassing, comprising a first condenser, a second condenser, a packed tower and a fan, wherein the first condenser is provided with a first feed inlet, a first discharge outlet, a first water inlet and a first water outlet;

the second condenser is provided with a second feed inlet, a gas outlet, a liquid outlet, a second water inlet and a second water outlet;

the packed tower is provided with a feed inlet, an air outlet and a liquid outlet; and the first discharge outlet of the first condenser is connected with the feed inlet of the packed tower, the second feed inlet of the second condenser is connected with the air outlet of the packed tower, and the gas outlet of the second condenser is connected with the fan, so that the first condenser, the second condenser and the packed tower are placed in a negative pressure environment with a relative vacuum of −5 kPa to 0 kPa; and a packer filled with packing is arranged in the packed tower, and the packer is located between the feed inlet and the air outlet, and the feed inlet is located between the air outlet and the liquid outlet of the packed tower;

wherein the packer is plate-shaped, and there is a plurality of packers, the plurality of packers are fixed in the packed tower, and the packers are in a parallel state, and there is a gap between two adjacent packers; the packer is provided with a tapered column, a tapered end of the tapered column faces the liquid outlet of the packed tower, and the packers are provided with a through hole;

wherein through holes of the packers in different levels are not located on a same straight line, so as to increase a flowing distance of a gas.

2. The device according to claim 1, wherein the device further comprises a guide pipe, an orifice of the guide pipe is connected with the feed inlet and another orifice of the guide pipe faces the liquid outlet of the packed tower.

3. The device according to claim 1, further comprising a collector, the collector being connected with the liquid outlet of the second condenser.

4. The device according to claim 1, further comprising a plug-in pipe, the plug-in pipe being arranged on the packed tower, two orifices of the plug-in pipe being both located outside the packed tower, a part of a pipe wall of the plug-in pipe is located inside the packed tower, and the plug-in pipe is hermetically matched with a tower wall of the packed tower.

5. The device according to claim 4, wherein the plug-in pipe is located between the packer and the liquid outlet of the packed tower.

6. The device according to claim 4, wherein the plug-in pipe is a round pipe, and the plug-in pipe is parallel to the packer.

* * * * *